US009641941B2

(12) United States Patent
Fischer

(10) Patent No.: US 9,641,941 B2
(45) Date of Patent: May 2, 2017

(54) TRANSDUCER SYSTEM

(71) Applicant: XARION Laser Acoustics GmbH, Vienna (AT)

(72) Inventor: Balthasar Fischer, Vienna (AT)

(73) Assignee: XARION LASER ACOUSTICS GMBH, Vienna (AT)

( * ) Notice: Subject to any disclaimer, the term of this patent is extended or adjusted under 35 U.S.C. 154(b) by 0 days.

(21) Appl. No.: 14/830,779

(22) Filed: Aug. 20, 2015

(65) Prior Publication Data

US 2015/0358742 A1 Dec. 10, 2015

Related U.S. Application Data

(63) Continuation of application No. 14/176,088, filed on Feb. 8, 2014, now abandoned, which is a continuation (Continued)

(30) Foreign Application Priority Data

Sep. 12, 2008 (EP) .................................... 08105330

(51) Int. Cl.
*G01B 9/02* (2006.01)
*H04R 23/00* (2006.01)

(52) U.S. Cl.
CPC .................................. *H04R 23/008* (2013.01)

(58) Field of Classification Search
CPC ........ G01B 9/02067; G01J 3/26; G02B 5/284

(Continued)

(56) References Cited

U.S. PATENT DOCUMENTS 4,272,734 A * 6/1981 Jarrett ..................... H01S 3/083 372/32
4,716,475 A * 12/1987 Dutcher ........... G11B 20/10212 360/45

(Continued)

FOREIGN PATENT DOCUMENTS

DE 102006013345 A1 10/2007
EP 2338287 B1 7/2013

(Continued)

OTHER PUBLICATIONS

Hecht (Optics, 2nd ed., Addison Wesley, ISBN 0-201-11609-X, 1987).*

(Continued)

*Primary Examiner* — Hina F Ayub
(74) *Attorney, Agent, or Firm* — Nadya Reingand

(57) ABSTRACT

Transducers and methods for converting acoustic signals into electrical signals. A device (100) includes an interferometer (106) including two mirrors (108) adapted for reflecting electromagnetic radiation (112) coupled into a space (110) between the mirrors (108). The acoustic signal (102) is to be coupled into the space (110) for influencing the electromagnetic radiation (112) in accordance with this acoustic signal. An electromagnetic radiation detector (112) is adapted for detecting the influenced electromagnetic radiation (112) and for converting the detected influenced electromagnetic radiation (112) into the electric signal (104) being indicative for the acoustic signal (102). An operation point stabilization unit stabilizes an operation point of the device (100).

18 Claims, 2 Drawing Sheets

Related U.S. Application Data of application No. 13/063,846, filed as application No. PCT/IB2009/053962 on Sep. 10, 2009, now abandoned.

(58) Field of Classification Search
USPC .......................................... 356/519, 480, 506
See application file for complete search history.

(56) References Cited

U.S. PATENT DOCUMENTS

| | | | | |
|---|---|---|---|---|
| 4,853,935 | A | 8/1989 | Laine et al. | |
| 5,137,361 | A * | 8/1992 | Heon | G01H 9/006 356/502 |
| 5,172,390 | A * | 12/1992 | Mooradian | G02B 6/4204 372/50.11 |
| 5,402,235 | A | 3/1995 | Monchalin | |
| 5,717,350 | A * | 2/1998 | Bohrer | H03B 28/00 327/100 |
| 5,798,859 | A | 8/1998 | Colbourne et al. | |
| 6,014,239 | A | 1/2000 | Veligdan | |
| 6,055,080 | A | 4/2000 | FursTenau et al. | |
| 6,289,143 | B1 | 9/2001 | Berthold et al. | |
| 6,301,034 | B1 | 10/2001 | Speciale | |
| 6,414,919 | B1 * | 7/2002 | Immink | G11B 7/126 369/47.28 |
| 6,590,661 | B1 | 7/2003 | Shnier | |
| 6,747,741 | B1 | 6/2004 | Kleinschmidt | |
| 6,747,775 | B2 | 6/2004 | Little | |
| 7,355,720 | B1 | 4/2008 | Carr | |
| 7,840,246 | B1 | 11/2010 | Poore | |
| 8,022,835 | B2 * | 9/2011 | Coleman | B60C 23/0423 250/227.12 |
| 2001/0015107 | A1 | 8/2001 | Feller | |
| 2001/0055137 | A1 * | 12/2001 | Kuri | H04B 10/50 398/163 |
| 2003/0118269 | A1 * | 6/2003 | Wimperis | G01J 3/26 385/14 |
| 2003/0223069 | A1 * | 12/2003 | DiFoggio | E21B 49/08 356/419 |
| 2004/0233455 | A1 | 11/2004 | Keller | |
| 2005/0073690 | A1 | 4/2005 | Abbink et al. | |
| 2005/0094158 | A1 * | 5/2005 | Paldus | G01N 21/39 356/519 |
| 2005/0151082 | A1 | 7/2005 | Coffin et al. | |
| 2005/0191008 | A1 | 9/2005 | Anson et al. | |
| 2005/0241398 | A1 | 11/2005 | Suzuki et al. | |
| 2006/0193356 | A1 | 8/2006 | Osiander et al. | |
| 2006/0262324 | A1 | 11/2006 | Hays et al. | |
| 2007/0165896 | A1 | 7/2007 | Miles et al. | |
| 2007/0223000 | A1 * | 9/2007 | Gahan | G01D 5/266 356/454 |
| 2008/0151348 | A1 | 6/2008 | Carr | |
| 2008/0225274 | A1 | 9/2008 | Hirata et al. | |
| 2009/0257753 | A1 | 10/2009 | Fischer | |
| 2010/0048982 | A1 * | 2/2010 | Puria | H04R 23/008 600/25 |
| 2014/0153930 | A1 | 6/2014 | Fischer | |

FOREIGN PATENT DOCUMENTS

| | | | |
|---|---|---|---|
| GB | 386315 | A | 1/1993 |
| JP | S59-016499 | A | 1/1984 |
| JP | S60-018100 | A | 1/1985 |
| JP | H01-231500 | A | 9/1989 |
| JP | H05-227597 | A | 9/1993 |
| WO | 2008/000007 | A1 | 1/2008 |

OTHER PUBLICATIONS

International Search Report and International Preliminary Report on Patentability, dated Dec. 2, 2009, from parent PCT/IB2009/053962; in English.

Degertekin, F., et al. "Micromachined Microphones With Diffraction-Based Optical Interferometric Readout and Electrostatic Actuation," 19th Annual Congress on Acoustics; Madrid, Spain, Sep. 2007; (5 pp.).

Wang, W. et al. "Design of Performance-Enhanced Fabry-Perot Micro-Cavity Structure With a Novel Single Deeply Corrugated Diaphragm," Nanotech 1 (2003) (4pp., pp. 336-339).

Gabrielson, T., "Mechanical-Therman Noise in Micromachined Acoustic and Vibration Sensors," IEEE Trans. On Electron Devices: 40:5, pp. 903-909 (1993).

* cited by examiner

TRANSDUCER SYSTEM

This application is a continuation of copending U.S. application Ser. No. 14/176,088 filed on Feb. 8, 2014 which is a continuation of U.S. application Ser. No. 13/063,846 entered on Mar. 14, 2011 as a section 371 U.S. national phase of PCT International appl. no. PCT/IB2009/053962 filed on Sep. 10, 2009 designating the U.S., claiming benefit of priority to prior European application no. EP 08105330 filed on Sep. 12, 2008, these priority claims being identically applicable to the present application, and U.S. application Ser. No. 14/176,088 as well as U.S. application Ser. No. 13/063,846 and parent PCT appl. no. PCT/IB2009/053962 are all incorporated herein by reference in their entireties and as to all their parts, for all intents and purposes, as if identically set forth in full herein.

FIELD OF THE INVENTION

The present disclosure relates to devices for converting acoustic signals into electric signals. Beyond this, the present disclosure relates to methods of converting acoustic signals into electric signals. Moreover, present disclosure relates to program elements. Furthermore, the present disclosure relates to non-transitory computer-readable media.

BACKGROUND

Audio recording devices become more and more important. Particularly, an increasing number of users buy communication devices, headphone-based audio recorders and mobile computing systems.

A microphone may be denoted as an acoustic-to-electric transducer or sensor that converts sound into an electrical signal. Microphones are employed in many applications such as telephones, tape recorders, hearing aids, motion picture production, live and recorded audio engineering, in radio and television broadcasting and in computers for recording voice, and for non-acoustic purposes such as ultrasonic checking.

A common design uses a thin membrane that vibrates in response to sound pressure. This movement is subsequently translated into an electrical signal. Conventional microphones for audio use electromagnetic generation (dynamic microphones), capacitance change (condenser microphones) or piezoelectric generation to produce the signal from mechanical vibration.

JP S60-018100A discloses to detect directly a density change of a propagation medium by using a means that irradiates a laser light into the propagation medium of sound waves and a laser light detecting means to constitute a microphone. A laser beam delivered from a laser light emitting means is divided into two paths by a beam splitter. The first beam propagates through a solid medium; while the second beam propagates through a propagation medium of sound waves. Both beams are synthesized by a reflector and a beam splitter, and the intensity of the synthetic beam is detected by a photo detecting means. A density change of the medium is produced in response to the variation of sound pressure. This produces the variation of propagating speed of the beam and then the variation of phase. Then the sound pressure is detected in the form of a change of intensity of the synthetic beam by having the systemization and interference between the beams.

U.S. Pat. No. 6,590,661 discloses methods for remotely sensing sound waves in an optically transparent or semi-transparent medium through detecting changes in the optical properties of the medium, that are caused by the sound waves. For example, to implement a microphone that can sense sound at a distance from the sound source. The variations in the attenuation or the phase of a beam of light that is received after passing through the sound waves are sensed and converted to an electrical or other signal. For the attenuation method, the wavelength of the beam of light sensed is selected to be one that is highly attenuated by a constituent of the medium, so that the changing instantaneous pressure of the medium due to the sound pressure waves can be detected through the changing light attenuation due to the changing density of the air along the light path. For the phase shift method, the velocity of light, and therefore its phase is changed by the changing density of the air due to the sound waves, and this can be detected through interferometric means.

JP H5-227597A discloses that, to obtain a microphone of low distortion, a broad band and a broad dynamic range, a diaphragm receiving an acoustic wave is excluded. An acoustic wave is inputted into an acoustic input part that is released and has air in it. A laser beam moves back and forth between a pair of reflecting mirrors to be one component of a Fabry-Perot laser beam interferometer so as to cross the acoustic wave. The optical path length of the laser beam is optically and equivalently changed with the change of the roughness/fineness of air corresponding to the acoustic pressure of the acoustic wave at each time, and a light receiving device catches it.

However, conventional optical microphones may still lack accuracy in detecting acoustic signals, particularly when environmental conditions change.

OBJECT AND SUMMARY

It is within the scope of the present disclosure to provide a transducer being sufficiently accurate in detecting acoustic waves.

In order to achieve the object defined above, a device for converting an acoustic signal into an electric signal, a method of converting an acoustic signal into an electric signal, a program element and a computer-readable medium may be provided.

According to a disclosed version, a device (such as an acoustic-electric transducer like a microphone) for converting an acoustic signal into an electric signal is provided, wherein the device includes an interferometer including two for instance parallel aligned (or more particularly arranged with reflective surfaces opposing one another and being arranged parallel to one another) for instance fixed (for instance non-flexible and non-movable) mirrors adapted for reflecting at least a part of electromagnetic radiation (such as light) coupled into a space between the mirrors (particularly for reflecting electromagnetic radiation between the mirrors a plurality of times), wherein the acoustic signal is to be coupled (or introduced) into the space for influencing (or manipulating) the electromagnetic radiation (more particularly for characteristically changing at least one property of the electromagnetic radiation as a consequence of a physical property of the acoustic signals which, in turn, characterizes a content of the acoustic signal) in accordance with the acoustic signal, an electromagnetic radiation detector adapted for detecting the influenced (or manipulated) electromagnetic radiation and for converting the detected influenced electromagnetic radiation into the electric signal being indicative for the acoustic signal (for instance carrying the information included in the acoustic signal), and an operation point stabilization unit adapted for stabilizing an operation point of the device (for instance upon change of a device-extrinsic condition such as a change of an environmental condition like air pressure, or upon change of a device-intrinsic condition such as a continuous altering of a member of the device, for instance of the electromagnetic radiation detector and/or an electromagnetic radiation source).

According to another exemplary disclosed version, a method of converting an acoustic signal into an electric signal is provided, wherein the method includes reflecting electromagnetic radiation coupled into a space between two mirrors of an interferometer, coupling the acoustic signal (particularly simultaneously with the electromagnetic radiation so that the acoustic waves as well as the electromagnetic radiation propagate simultaneously through a volume defined by the two parallel mirrors) into the space for influencing the electromagnetic radiation in accordance with the acoustic signal, detecting the influenced electromagnetic radiation and converting the detected influenced electromagnetic radiation into the electric signal being indicative for the acoustic signal, and stabilizing the method at a present operation point.

According to still another exemplary disclosed version, a program element (for instance a software routine, in source code or in executable code) may be provided, that, when being executed by a processor, is adapted to control or carry out a working point stabilization method having the above mentioned features.

According to yet another exemplary disclosed version, non-transitory computer-readable media (for instance a CD, a DVD, a USB stick, a floppy disk or a hard disk) may be provided, in which a computer program is stored that, when being executed by a processor, is adapted to control or carry out a data processing method having the above mentioned features.

Data processing for transducing purposes which may be performed according to disclosed versions may be realized by a computer program, that is by software, or by using one or more special electronic optimization circuits, that is in hardware, or in hybrid form, that is by means of software components and hardware components. For instance, it is also possible to realize embodiments of the invention using an ASIC (Application Specific Integrated Circuit), a microcontroller, a microcomputer, or an FPGA (Field Programmable Gate Array).

The term "acoustic signal" may particularly denote mechanical waves carrying acoustic information such as speech, music, or other sounds. Physically, an acoustic wave may be considered as a small pressure change that moves at the speed of sound. The frequency range of such acoustic signals may cover the frequency range of a human being is able to perceive, however, it may also cover infrasound and ultrasound acoustic signals.

The term "electromagnetic radiation" may denote photons of any desired wavelengths. Thus, electromagnetic radiation may propagate with the speed of light, wherein the exact speed of traveling depends on the medium through which the electromagnetic radiation propagates. Such an electromagnetic radiation beam may particularly be an optical light beam (for instance having a wavelength in a range between 400 nm and 800 nm), may be infrared radiation, ultraviolet radiation, or may be in another wavelength range such as X-rays.

The term "electric signal" may particularly denote a signal encoded in an electric current or other charge carriers traveling along a wire-bound propagation path. For instance, electrons may be carriers of electric signals.

The term "interferometer" may particularly denote an instrument that employs the interference of electromagnetic waves, particularly light waves, to measure properties of a medium through which the electromagnetic radiation propagates. Thus, it may denote a device that measures the interference (and related phenomena) of electromagnetic radiation. More particularly, the interference of wave forms may be used for this purpose. Interferometry is thus the technique of superimposing (interfering) two or more waves, to detect differences between them.

The term "two parallel aligned fixed mirrors" may particularly denote at least two, more particularly exactly two, mirrors that are spaced at a predefined distance from one another and are spatially fixed. These mirrors may have a plane-parallel arrangement relative to one another so that electromagnetic radiation reflected at one of the mirror surfaces may propagate multiple times between the two mirrors to promote interference effects so that the resulting electromagnetic radiation reflects information included in the acoustic wave (and thus pressure) properties in a space between the two mirrors. Such mirrors may have a reflective surface, which may reflect to a majority of, for instance 95%, of light impinging on the reflective surface. The mirrors may have a planar (that is flat) or a curved (for instance concave) reflective surface. Possible embodiments of the two mirrors may be | . . . |, ( . . . ), | . . . ), ( . . . |, etc.

The term "operation point" may particularly denote a working characteristic of the device, that is may denote how the device responds to input signals. A change of an operation mode may be present when identical optical and acoustic input signals result in a changed output, that is a changed electric signal.

The term "stabilizing" may particularly denote that the system may identify a changed actual operation mode and may take necessary steps for driving back the system to a target operation mode or a reference operation mode in which the system responds in a desired or adjusted manner.

According to an exemplary disclosed version, an interferometer formed by two reflection mirrors is activated with an electromagnetic radiation beam propagating between the mirrors multiple times. Upon introduction of acoustic waves carrying an acoustic content or acoustic information into a space delimited between the mirrors, the actual pressure properties in the sampling space (which is at the same time the medium through which the electromagnetic radiation propagates) may change in time and are therefore characteristically modified in accordance with the content of the acoustic signal. By sampling the electromagnetic radiation within the interferometer as a result of the interaction with the acoustic signal may allow to derive an output detector signal, which is characteristic for the content of the acoustic signal. Thus, a particularly optical microphone may be provided which has a very high accuracy due to the implementation of an interferometer formed by two parallel-aligned fixed mirrors. Since such an arrangement does not require using mechanically movable parts, complex and heavy optical elements such as beam splitters or reference paths along which a split electromagnetic radiation beam travels may be omitted. Thus, the manufacturing effort may be kept small and the mechanical stability may be increased. Moreover, the adjustability and the signal-to-noise ratio are advantageous, and the microphone may be manufactured in a compact manner. It is also integratable in other apparatuses easily, since the performance of the device will not be negatively affected by magnetic fields or the like, which may occur in conventional microphones.

The implementation of an interferometer in the transducer is based on the gist that the interference of a plurality of partial beams is promoted so that the accuracy of detection is very high. Due to these technical measures, the microphone is capable of being very accurate in detecting of also high acoustic frequencies (of up to 20 kHz and also above), can be manufactured in a compact manner (for instance monolithically integrated in semiconductor technology) with high mechanical stability. A stabilization function ensures that the microphone does not drift away from a desired working point, which drift may result from changed environmental conditions such as atmospheric pressure or the like. Hence, devices according to exemplary embodiments may be employed even under harsh conditions. Next, further exemplary embodiments of the device will be explained. However, these embodiments also apply to the method, to the program element and to computer-readable medium.

The operation point stabilization unit may be adapted for stabilizing the operation point by monitoring at least one parameter, particularly by monitoring the electric signal (or a part thereof, for instance a direct current part thereof), indicative of the present operation point of the device and, upon determining a deviation of the present operation point from a predefined target operation point, controlling the device so that the operation point is returned to the target operation point. A preferred embodiment of the device is related to a stabilization of the working point of the transducing system. This may include the compensation of changes of external influences by taking several measures, particularly by feeding back the electric output of the transducer to a circuitry that may, if desired or necessary, modify an operation mode or operation parameters (for instance a drive current for powering a light source) of the system to thereby stabilize the working point of the device.

The interferometer may be a Fabry-Perot interferometer. Such a Fabry-Perot interferometer or etalon may be made of two parallel highly reflecting mirrors. Between these mirrors, a medium such as air may be present that can be acoustically coupled to a sound source generating the acoustic waves to be detected. However, as an alternative to air, many other media are possible for propagating the acoustic waves. Examples for such alternative media are other gases, water, blood (for embodiments of the device used for medical applications, for instance as medical probes), other liquids, gelatine, or solids.

The transmission spectrum of a Fabry-Perot interferometer as a function of wavelength exhibits peaks of large transmission corresponding to resonances of the etalon. It may be highly advantageous to implement a Fabry-Perot interferometer in a transducer according to an exemplary embodiment since this allows for a compact, robust and simple arrangement, which delivers a proper performance.

The two parallel-aligned fixed mirrors may be adapted for reflecting, multiple times, optical light coupled into the space between the mirrors. Thus, the system may operate with visible light and therefore allows for a simple construction since optical light sources, optical light detectors as well as corresponding optical elements are available and can be implemented in a simple manner for exemplary disclosed embodiments. It may be desirable to use coherent basically monochromatic light to promote interferometric effects.

Alternatively, the interferometer may be a Gires-Tournois interferometer that is an optical standing-wave resonator designed for generating chromatic dispersion. The front mirror is partially reflective, whereas the back mirror has a high reflectivity. Here radiation source and detector are arranged on the same side.

The electromagnetic radiation detector used in the device may for example comprise a photodiode. A photodiode may be denoted as a semiconductor diode that changes its electrical characteristic in response to illumination. More particularly, a photodiode may be a semiconductor two terminal component whose electrical characteristics are light sensitive.

The electromagnetic radiation detector may be attached directly (for instance without any layer or component in between) on one of the two mirrors. In other words, it is possible that the detector, for instance a photodiode, is mounted or assembled onto a surface of one of the mirrors allowing for a very compact arrangement and a high accuracy, since optical misalignment may be safely prevented. In other embodiments, it is possible that there is a layer or a coating between mirror and detector, for instance an anti-reflection layer.

The device may further include an electromagnetic radiation source adapted for generating the electromagnetic radiation to be coupled into the space between the mirrors. Such an electromagnetic radiation source may be a component, which generates electromagnetic radiation such as light upon corresponding excitation, for instance using electric current. An electric mechanism of generating the electromagnetic radiation may be particularly advantageous since it allows regulation of the emission characteristics of the electromagnetic radiation source by adjusting the electric excitation signal (such as an electric current).

The electromagnetic radiation source may be adapted for generating the electromagnetic radiation with a high frequency carrier wave. When the electromagnetic radiation is modulated on a high frequency carrier wave (of for instance 20 MHz), it is possible to significantly increase the signal-to-noise ratio of the corresponding detection system. Therefore, taking this measure, the optical microphone may be operated with high precision.

The electromagnetic radiation source may be attached directly (for instance without any component or layer in between) on one of the two mirrors. Particularly, one of the electromagnetic radiation detector and the electromagnetic radiation source may be attached to one of the two mirrors, and the other one of the two components may be attached to the other one of the two mirrors. This may allow to obtain a very compact and accurate optical microphone with short propagation paths since both light introduction and light detection are performed spatially close to one another. In other embodiments, it is possible that there is a layer or a coating between mirror and light source, for instance an anti-reflection layer.

As an alternative, it is possible to realize the light source, the mirrors and the light detector as a common block, for instance to integrate these components into a semiconductor block such as a silicon block.

The electromagnetic radiation source may comprise a laser, particularly may comprise a vertical cavity surface emitting laser (VCSEL). Such a VCSEL is a type of semiconductor laser diode with a laser beam emission perpendicular to a top surface. Alternatively, other versions may also use edge emitting semiconductor lasers, which emit from surfaces formed by cleaving the individual chip out of a wafer. A VCSEL may be an advantageous embodiment because it may be cheap in manufacture, may be controllable over a large range of wavelengths and may be small in size. Using a laser may ensure that monochromatic coherent light is used.

Alternatively, the electromagnetic radiation source may comprise a distributed feedback laser, where the active region of the laser device is structured as a diffraction grating. The grating, known as a distributed Bragg reflector, provides optical feedback for the laser during distributed Bragg scattering from the structure hence it does not use discrete mirrors to form the optical cavity.

The electromagnetic radiation source may comprise a further electromagnetic radiation detector integrated in or attached to, that is to say functionally assigned to, the electromagnetic radiation source. For instance, an additional photodiode may be embedded in the electromagnetic radiation source so that a combined "source and auxiliary detector member" may be provided. The signal of this auxiliary detector may be used for a differential amplifier as a second differential amplifier input in addition to a first differential amplifier input provided by the main detector and may be indicative of the radiation properties at the position of the electromagnetic radiation source. By such a differential signal analysis, the accuracy may be further increased.

Thus, the device may also comprise a differential amplifier having a first input coupled to the electromagnetic radiation detector, having a second input coupled to the further electromagnetic radiation detector and having an output at which the electric signal being indicative for the acoustic signal is provided. The obtained differential signal may be independent of disturbing noise from the electromagnetic radiation source or the electric power source operating the electromagnetic radiation source.

The device may further comprise a rigid connection element rigidly connecting the two parallel aligned fixed mirrors and delimiting the space between the mirrors. A rigid connection element such as a bar or the like may connect the two mirrors to have a defined distance, which cannot be changed unintentionally. By providing such a rigid connection element, it may be made possible that the optical microphone is also usable under harsh conditions such as in a mobile phone or any other portable device where the optical microphone may be subject of mechanical shocks or the like. By rigidly connecting the two parallel aligned mirrors with an air gap in between, an undesired misalignment of the optical system upon exertion of a mechanical shock may be safely prevented.

The device may further comprise an electric signal separator adapted for separating the electric signal into a direct current (DC) component and into an alternating current (AC) component, wherein the alternating current component may be considered as being indicative for the acoustic signal. For example, such an electric signal separator may be a bias tee (AC coupling) which supplies the alternating current component to an analysis circuit for deriving the acoustic information in electric form. In contrast to this, the DC component may be analyzed in a feedback circuit for controlling a power source for powering the light source with electric current. A bias tee may be denoted as a kind of multiplexer that has three ports arranged in the shape of a "T" and where sufficiently high frequencies (for instance from 20 Hz to 100 kHz) pass horizontally through the T and lower frequencies take a 90° turn. Such a bias tee may be simply composed of one capacitor and one coil.

The device may comprise a feedback circuit (comprising one or more electronic members connected in a feedback loop) being supplied with the derived direct current component. The feedback may be adapted for determining an operating point (or working point) of the device, that may be derived from the direct current component and for controlling the electromagnetic radiation source so that the operating point is adjusted to a predefined reference (or target) operating point. Such a feedback circuit may be an electric circuitry, that couples an output of the electric signal separator back to a power supply of the electromagnetic radiation source. In such a feedback circuit, a number of active and/or passive electronic components or an integrated circuit (such as an ASIC or an FPGA) may be arranged that may analyze the direct current component for determining whether a "real" actual operation point has drifted away from a "desired" target or reference operation point and may accordingly alter the actuating variable. Such a circuit may be a Proportional Integral Differential (PID) regulation circuit. In such a scenario, the system is regulated to be driven back to the desired operating point, for example by modifying the electric powering signal (particularly a current) of the power source of the electromagnetic radiation source, changing an emission characteristic such as an emission wavelength of a laserdiode. A control response time of the feedback loop may be comparable slow, for instance in the range of milliseconds (e.g. 20 ms to 100 ms).

In a further embodiment the feedback loop may be designed such the control response time is fast, that is to say in the range of microseconds (e.g. 5 μs to 50 μs).

By taking this measure, changes in the environment due to a different temperature, air pressure or the like may be at least partially, preferably entirely, compensated (note that the transmission function through an etalon is periodic).

The device may be monolithically integrated in a substrate. For example, a device may be manufactured in semiconductor technology, more particularly silicon technology or in ceramics technology. Thus, a part or all of the components of the device may be monolithically integrated in such a semiconductor substrate using deposition, etching, lithography, or other procedures. This may allow for a very compact arrangement of the device.

The device may form part of any acoustic system, particularly implemented in a portable device. For instance, an embodiment may be or may be part of a microphone, an audio surround system, a mobile phone, a headset, a headphone playback apparatus, a loudspeaker playback apparatus, a hearing aid, a television device, a video recorder, a monitor, a gaming device, a laptop, an audio player, a DVD player, a CD player, a harddisk-based media player, a radio device, an internet radio device, a public entertainment device, an MP3 player, a hi-fi system, a vehicle entertainment device, a car entertainment device, a medical communication system, a medical device (such as a blood probe), a body-worn device, a speech communication device, a home cinema system, a home theatre system, a flat television apparatus, an ambiance creation device, a subwoofer, or a music hall system. Consequently, the device may be applied in each scenario in which a miniature optical microphone may be advantageous. Particularly, the small dimensioned and cheap device may be suitable for portable device applications such as mobile phones in which a robust, accurate and cheap microphone is desired.

A disclosed version provides an optical microphone without a membrane. Omission of a membrane may have the advantage that a microphone does not suffer from membrane-based limitations of the design. For instance, a membrane based system may have to consider material specific or geometric limitations such as a distance between membrane and a back electrode, a back volume, a resonance, perforation of the back electrode, required stiffness and surface properties of optical microphones, etc. Embodiments may further overcome the conventional signal averaging effect caused by a non-uniform elongation of the membrane of optical microphones. Thus, an electro-optical-acoustical transducer for transducing acoustic signals (such as speech, music or other noise) into an electric voltage is provided, that has a high dynamic range, a large signal-to-noise ratio, a large frequency range and a high range of linear behavior. Such a microphone may be free of any mechanically movable components such as a membrane. By taking this measure, a number of problems resulting from the presence of a membrane may be overcome, particularly an undesired sensitivity regarding body sound, back volume, design limitations and material limitations. Embodiments disclosed may be less sensitive regarding body noise. Such embodiments have a high mechanical stability and are not sensitive with regard to disturbing wind noise or the like.

As a result of the purely optical functional principle, a microphone according to an exemplary disclosed version is not prone to disturbing electromagnetic fields. Using a Fabry-Perot resonator without the necessity of a light guide, a simple construction may be obtained, and no reference signal is necessary. When using a semiconductor laser diode, particularly a VCSEL, it is possible to adjust the operating point of the microphone by a continuous modification of the current driving the laser. Thus, changes of the external conditions regarding weather, altitude, pressure or temperature may be compensated. By implementing a differential signal evaluation architecture, it is possible that the measurement signal becomes independent or less dependent of undesired noise sources such as laser noise. Additionally, it is possible to modulate the wavelength of the laser diode by influencing the supply current by a high frequency modulation in order to obtain an improved signal-to-noise ratio. Since the microphone according to an embodiment may be manufactured monolithically integrated on semiconductor basis, the system may be miniaturized.

In an embodiment, a Fabry-Perot etalon, a photodetector and a VCSEL laser diode may be combined for the construction of a microphone omitting a membrane, wherein a change of the supply current of the laser may allow to maintain a target operating point of the system. Since the supply current has an influence on the emission wavelength of the laser, the transmission through the etalon can be changed by changing the wavelength, thereby adjusting the operation point of the device. Concluding, the supply current of the electromagnetic radiation source can be used to adjust the operation point. Simultaneously, it is possible to use a detector for evaluating the use signal (for instance in a frequency range between 20 Hz and 20 kHz) and for gaining the regulation signal for stabilizing the operating point (for instance <20 Hz). By providing an integrated regulation loop, it is possible to maintain an optimum operating point. Thus, undesired environmental factors will not negatively influence such a device.

It is possible to use a reference detector immediately adjacent to the laser diode for a differential signal evaluation. As a reference detector, it is also possible to implement a photodiode in a laser diode.

In an embodiment, a high frequency modulation of the laser with a frequency above the use range and a selective evaluation may be made possible, in order to further increase the signal-to-noise ratio.

The system according to an embodiment is highly sensitive and has a high dynamic range in combination with a small intrinsic noise. It is possible to transfer even high acoustic pressures in a linear way. The so-called mechanical-thermal noise may be reduced or minimized. Due to the integrated manufacturability, the device may be manufactured with high cost efficiency. Other acoustic wave sampling probes as compared to visible light are possible, for instance infrared radiation or ultraviolet radiation. Due to the absence of a reference cell in exemplary embodiments, the construction is simple and compact.

The aspects defined above and further aspects are apparent from the examples of embodiments to be described hereinafter and are explained with reference to these examples of embodiments.

BRIEF DESCRIPTION OF THE DRAWINGS

The invention will be described in more detail hereinafter with reference to examples of embodiment but to which the invention is not limited. The illustrations in the drawings are schematic. In different drawings, similar or identical elements are provided with the same reference labels.

DETAILED DESCRIPTION

Reference in this specification to “one embodiment,” “an embodiment,” “one version,” “a version,” should be understood to mean that a particular feature, structure, or characteristic described in connection with the version, or embodiment is included in at least one such version, or embodiment of the disclosure, and may be included in more than one embodiment or version. The appearances of phrases “in one embodiment”, “in one version,” and the like in various places in the specification are not necessarily all referring to the same version, or embodiment, nor are separate or alternative versions, variants or embodiments mutually exclusive of other versions, variants, or embodiments. Moreover, various features are described which may be exhibited by some versions, or embodiments and not by others. Similarly, various requirements are described which may be requirements for some versions, variants, or embodiments but not others. If the specification states a component or feature “may”, “can”, “could”, or “might” be included or have a characteristic, that particular component or feature is not required to be included or have the characteristic.

Furthermore, as used throughout this specification, the terms ‘a’, ‘an’, ‘at least’ do not denote a limitation of quantity, but rather denote the presence of at least one of the referenced item, and any usage of the term ‘a plurality’ denotes the presence of more than one referenced items.

The terms “connected” or “coupled” and related terms are used in an operational sense as shall be understood in context, and are not necessarily limited to a direct connection or coupling.

Figure 1:
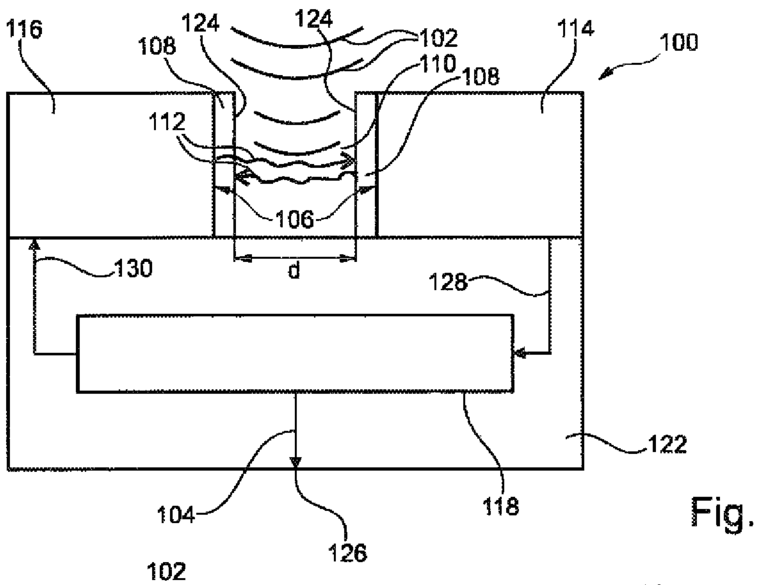
FIG. 1, FIG. 2 and FIG. 4 show optical microphones according to exemplary versions.

FIG. 1 shows a device 100 for converting acoustic waves 102 into an electric signal 104.

The device 100 serves as a miniature optical microphone for implementation in a mobile phone. The device 100 can be implemented in other portable devices as well (for instance a palm, a laptop, a headset, a watch, a lavalier-microphone, a play-station, etc.). As can be taken from FIG. 1, the optical microphone 100 is monolithically integrated in a semiconductor substrate 122 in and on which several microtechnological components are formed.

The device 100 comprises a Fabry-Perot interferometer 106, that includes a first mirror 108 having a first light reflective surface 124 and a second mirror 108 also having a light reflective surface 124. The two mirrors 108 are spaced from one another by a distance d=0.1 mm (other distances are of course possible, for instance 1 mm) and define a space 110 in between which is acoustically coupled with a surrounding environment so that the acoustic waves 102 originating from an acoustic source (not shown, for instance the voice of a user operating a mobile phone in which the device 100 is mounted as a microphone) may propagate into the space 110. The two mirrors 108 are arranged plane-parallel to one another and are spatially fixed, that is are not elongated in the presence of the acoustic waves 102. In other words, the device 100 is free of any membrane or other movable component and can thus be constructed without being prone to mechanical disturbing effects. The mirrors 108 are adapted for at least partially reflecting a light beam 112, which propagates multiple times between the two opposing mirrors 108 and is reflected multiple times at the reflective surfaces 124 of the mirrors 108. As can be taken from FIG. 1, the acoustic wave 102 is acoustically coupled into the space 110 (which may also be denoted as a sampling volume) for influencing the optical beam 112 in accordance with a content of the acoustic signal 102.

Hence, the miniature system 100 converts the acoustic signal 102 first into an optical signal in the form of the manipulated propagating light beam 112, and subsequently in an electric signal 104, as will be explained in the following.

The monolithically integrated device 100 comprises a laser 116 as a light source for generating the electromagnetic radiation beam 112 and for coupling the electromagnetic radiation beam 112 into the space 110. As can be taken from FIG. 1, the laser 116 is attached directly to the mirror 108 on the left-hand side of FIG. 1.

Additionally to the previously described components, the device 100 further includes a photodiode 114, that is adapted for detecting the influenced electromagnetic radiation beam 112 and for converting the detected influenced electromagnetic radiation beam 112 into the electric signal 104, which is indicative for the acoustic signal 102. Thus, the photodiode 114 generates an electric current signal upon interaction with the photons 112. Influenced by the pressure conditions in the space 110 due to the presence of the acoustic waves 102, the detected optical signal 112, which is converted into an electrical signal 104 by the photodiode 114, carries the information or data which is also included in the acoustic signal 102. As can be taken from FIG. 1, there is a direct mechanical connection between the mirror 108 on the right-hand side of FIG. 1 and the photodiode 114.

As can be taken from FIG. 1, an electric circuit 118 is monolithically integrated in the silicon substrate 122 (other substrate materials are of course possible as well). This monolithically integrated electric circuitry 118 is capable of analyzing or evaluating the electric signal received from the photodiode 114. At an external interface 126 the electric signal 104 can be supplied to a periphery device or a connected device.

FIG. 1 depicts an electric connection 128 between the photodiode 114 and the circuit 118 and shows a feedback loop 130 connecting the monolithically integrated circuitry 118 to the light source 116 so that the powering of the light source 116 can be made dependent on the signal fed back via the feedback line 130, thereby allowing the device 100 to adjust a desired operating point. Particularly, the drive current for powering the light source 116 may be controlled for changing the wavelength of the light beam 112, thereby adjusting the transmission characteristic of the etalon 106, consequently influencing the operation point of the device 100.

In an alternative embodiment the drive current for powering the light source 116 may be used as error signal of the feedback loop 130, i.e. the feedback loop 130 is not connected to the photodiode 114 (respectively the electrical signal 104) but rather to the light source 116 to take the drive current.

In the following, referring to FIG. 2, an optical microphone 200 according to another exemplary embodiment of the invention shall be described.

Figure 2:
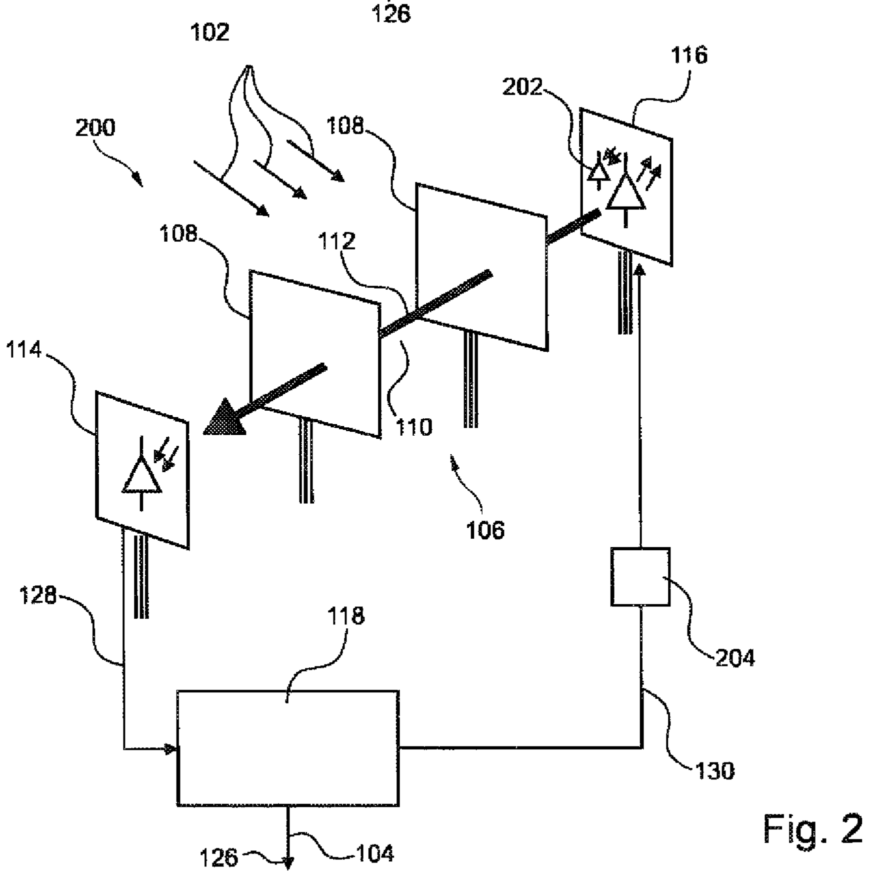

FIG. 2 shows, inter alia, that the electromagnetic radiation source 116 comprises a further photodiode 202 which is integrated in the electromagnetic radiation source 116. The further photodiode 202 will detect a signal that is characteristic for the emission beam of the light source 116. As can be taken from FIG. 4 in more detail, this signal may be used for a differential amplifier analysis to further increase the accuracy.

Furthermore, FIG. 2 shows an electric power source 204 providing a variable control current for the light source 116. The power source 204 is, in turn, under control of the control circuitry 118 that is, in the embodiment of FIG. 2, an external electronic member (in contrast to the integrated solution of FIG. 1).

Still referring to FIG. 2, a laser beam 112 from a VCSEL laser diode 116 is directed onto a Fabry-Perot etalon 106 consisting of two absolutely rigid plane-parallel mirrors 108. Due to the mirror arrangement 108, constructive and destructive interferences are formed at the photodiode 114. The photodiode 114 converts the impinging light intensity into a proportional electric voltage that forms the basis for the output signal 104 of the microphone 200 representing the audio content of the acoustic signal 102.

The transmission characteristic of the Fabry-Perot etalon 106 depends on the pressure in the sample volume 110 in such a manner that in the presence of a small air pressure only few light is transmitted, and a large amount of light is transmitted at a large air pressure. Thus, the output voltage may be considered proportional, particularly linearly proportional to the air pressure in proper approximation.

An acoustic wave 102, which can be considered as a local and temporary modification of the air pressure in the volume 110, also modifies the transmitted light intensity of the Fabry-Perot etalon 106 in such a manner that the output voltage 104 is proportional to the input acoustic wave 102.

Since also environmental influences such as altitude and weather may have an undesired influence on the transmission characteristics of the Fabry-Perot etalon 106, it is advantageous to at least partially compensate such influences. Modulating the wavelength of the laser light 112 may perform this. Correspondingly, increasing or decreasing the supply current to the laser diode 116 may achieve such a modulation. For such a regulation circuit, it is not necessary to provide an additional detector, so that it is possible to generate the regulation signal based on the use signal detector 114 only.

In order to compensate for undesired intensity and phase noise of the laser 116, it is possible to perform a differential signal evaluation. In such a scenario, the positive as well as the negative edge or shoulder of the transmission curve (compare reference numeral 306 in FIG. 3) may be evaluated. The differential signal of the two values is then free of undesired noise. The evaluation may be performed by two or more detectors simultaneously, or sequentially with a single detector.

It is also possible to modulate the light wavelength with a frequency that is significantly different (particularly significant above) the largest acoustic wave frequency to be measured (for instance 20 kHz). By an appropriate signal evaluation, it is possible to further increase the signal-to-noise ratio of the optical microphone 200.

In the following, the system will be described from a physical point of view.

The transmission function T of the Fabry-Perot etalon 106 can be described by the Airy function in the following manner:

$$T = \frac{I_L}{I_P} = \frac{1}{1 + \frac{4R\sin^2\delta/2}{(1-R)^2}}$$

wherein T is the degree of transmission, I is the intensity, L denotes the laser 116 (initial intensity), P is an index for the photodiode 114 (final intensity), R is the reflectance of the mirrors 108 (which is between 0 and 1).

Moreover, δ can be defined in the following way:

$$\delta = \frac{4\pi \cdot d \cdot n}{\lambda}$$

In equation (2), d is the distance between the mirrors 108, n is the refraction index of air (or of any other sound propagating medium, for instance any gas, liquid or other) being a function of the air pressure in volume 110, and λ is the wavelength of the laser light 112.

The refraction index n is not constant, but is dependent on the pressure of the sound propagating medium:

$$\Delta n = \Delta p \cdot 2.8 \cdot 10^{-9}/\text{Pa}$$

In equation (3), Δn is the change of the refraction index n of light, and Δp is the change of the air pressure.

The wavelength λ of a laser diode 116 depends on the value of the supply current. The change of the wavelength δλ can be approximated in the following manner:

$$\delta\lambda = k\left(\sqrt{\frac{I_0}{I_{th}}} - 1\right)$$

In equation (4), $I_0$ is the base current of the laser diode 116, $I_{th}$ is the threshold current of the laser diode 116, and k is a proportional constant.

A shift of the wavelength δλ by the supply current may be achieved with a VCSEL 116 without mode shift typically in a region of ±100 pm. The dependence of the wavelength from the temperature is about 50 pm/K.

Figure 3:
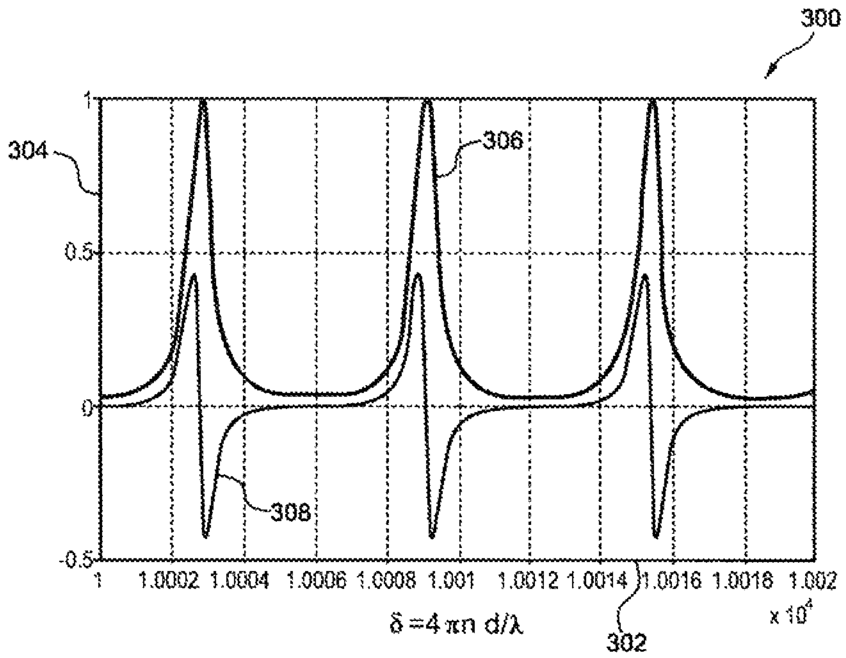
FIG. 3 shows a diagram illustrating operating points of an optical microphone according to an exemplary version.

FIG. 3 illustrates a diagram 300 having an abscissa 302 along which δ is plotted. Along an ordinate 304, a transmission function (Airy function) 306 is plotted as well as a normalized derivative 308 thereof. For FIG. 3, the reflectance R is assumed to be 0.7.

Hence, FIG. 3 shows the Airy function. The two operation points of the microphone 200 are at the positive edge and at the negative edge, respectively, of the Airy function, that is at a position where the derivative 308 is at a maximum or at a minimum value, respectively.

Figure 4:
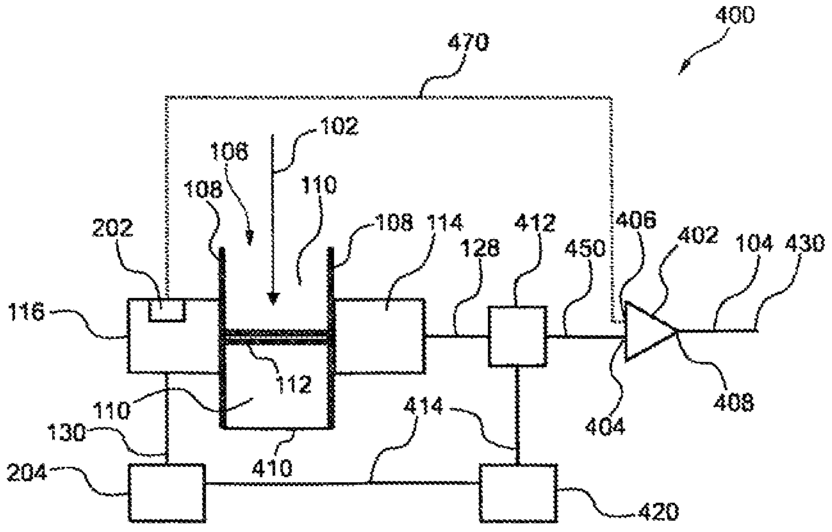

FIG. 4 shows an optical microphone 400 according to a further exemplary version.

The device 400 comprises a rigid connection element 410 rigidly connecting the two parallel aligned fixed mirrors 108 and delimiting as well as defining the space 110 between the mirrors 108. The mirrors 108 form a Fabry-Perot interferometer 106 that serves as a sampling member in FIG. 4.

Moreover, the device 400 comprises an electric signal separator 412 such as a bias tee adapted for separating electric signal components output by the photodiode 114 into a direct current (DC) component and into an alternating current (AC) component. The alternating current component is considered of being indicative for the actual content of the acoustic signal 102. Thus, the alternating signal component is supplied to an input 404 of a differential amplifier 402 (alternatively, for instance when no reference detector 202 is provided, it is possible to use a normal amplifier or preamplifier, for instance current- or voltage-amplifier), as will be described in the following in more detail.

In contrast to this, the direct current component output by the electric signal separator 412 is supplied to a regulator circuitry 420. The regulator circuitry 420 is part of a feedback loop 414 being supplied with the direct current component, wherein the feedback loop 414 is adapted for determining an operating point of the device 400 based on the direct current component and for controlling the electromagnetic radiation source 116 so that the operating point is adjusted to a reference operating point, particularly a desired target operating point. An output of the regulator circuitry 420 can be used as a control signal for controlling the electric power source 204 supplying the laser 116 with an electric current. The regulator 420 is a proportional differential integral regulator (PID regulator) for ensuring that the device 400 is operated in a desired operation mode.

In an alternative embodiment adjusting the operating point may be based on an alternative current signal, i.e. the feedback loop 414 may be supplied with an alternative current that is modulated to the laser current. Hereby a modulation frequency of the modulated signal has to be chosen accordingly (sampling theorem) thereby taking into account not to influence the detected acoustic signal 102.

The device 400 further comprises a differential amplifier 402 having a first input 404 coupled to an output of the light detector 114 (more precisely to an output of the bias tee 412 downstream the light detector 114 so that the AC component of the output signal of the light detector 114 is supplied to the first input 404). The differential amplifier 402 has a second input 406 coupled to an output of the further photodiode 202 integrated in the light source 116 and has an output 408 at which the electric signal 104 being indicative for the acoustic signal 102 is provided. The differential amplifier 402 serves as a preamplifier and can alternatively be a lock-in amplifier. A microphone output is denoted with reference numeral 430 in FIG. 4.

Laser light from the VCSEL 116 impinges on the mirror 108 on the left-hand side of FIG. 4 and partially transmits this mirror 108. The resulting light beam 112 is then reflected between the two mirrors 108 to reciprocate in the space 110. The two mirrors 108 are coupled in a coplanar manner to one another by the rigid connection element 410. Depending on the acoustic field 102 and an adjusted operating point of the device 400, wherein the latter is adjustable by the regulator 420 and the current source 204, a part of the laser light 112 impinges on the photodiode 114. The electrical signal proportional to the light intensity is supplied via a connection line 128 to the bias tee 412, where the signal is separated in its AC and DC component. The AC component is transferred via the connection 450 to the input 404 of the amplifier 402 and defines the output of the microphone 430.

The DC component is supplied via a connection line 414 to the regulator 420. A control signal is supplied via a connection 414 to the current source 204 for correspondingly controlling the light source 116.

In the light source 116, the photodiode 202 is integrated and generating an electrical signal which is proportional to the emission intensity of the VCSEL 116. This signal is supplied via a connection 470 to the second input 406 of the amplifier 402. The differential signal 114 generated by the differential amplifier 402 is independent of disturbing noise of the VCSEL 116 or the current source 204.

The current source 204 can be configured for high frequency modulation. In such a scenario, amplifier 402 may be adapted as a lock-in amplifier. The lock-in procedure may serve for increasing the signal-to-noise ratio.

The regulator 420 serves for a continuous maintenance of the operating point, which operating point may drift in an undesired manner by external influences such as changes of temperature, weather, pressure, altitude, etc. From the DC signal generated by the bias tee 412, it is possible that the regulator 420 generates a control signal for slightly increasing or decreasing the diode current from the current source 204. This may change the wavelength of the light source 116 to drive the system continuously at an optimum operating point.

As can be taken from FIG. 4, the light source 114 is directly attached on the mirror 108 on the left-hand side of FIG. 4 and the detector 114 is directly attached onto the mirror 108 on the right-hand side of FIG. 4.

The mirrors 108 may be dielectrically coated. The reflectance regarding the wavelength of the light source 116 can be low (for instance 10%) or high (for instance 99.9%). Typically, the reflectance may be 90%.

Optionally, the mirrors 108 may be manufactured from a material with a high refraction index (such as gallium arsenide) so that a Fresnel reflection may be generated by cleaving.

Optionally it is possible that the detector 114 is accommodated in the same housing as the light source 116.

The VCSEL 116 may be tunable regarding wavelength over a larger range as compared to an edge emitting laser diode (that however can also be implemented according to another exemplary embodiment). However, a VCSEL has a low current consumption and is cheap in manufacture. The wavelength of the diode 116 can be in the visible (VIS) range (for instance 670 nm) or in the infrared (IR) or in the ultraviolet (UV) range.

All used components are so compact that the microphone 400 can be manufactured with very small dimensions (millimeter or sub-millimeter dimensions). It is also possible that the microphone 400 is monolithically integrated, for instance on silicon basis.

Controlling the diode current may perform the stabilization of the operating point. When the current of the laser diode 116 rises, the wavelength of the laser diode 116 increases, and vice versa. The regulator circuit 420 operable via the feedback loop 414 may stabilize the operating point. The regulation may be performed with a frequency below the use range (for instance below 20 Hz or below 50 Hz) and may serve for the compensation of environmental influences. The optional detector 202 at which a laser light is converted into a voltage directly behind the laser diode 116 may be used as a reference detector 202, or may alternatively be omitted. Subsequently, in case the reference detector 202 is present, the difference between the use signal (detector 114 behind the Fabry-Perot etalon 106) and a reference signal is formed, in order to compensate for current noise or noise (i.e. relative intensity noise or frequency noise) of the laser diode 116.

In an alternative embodiment, the radiation source may be frequency modulated with high frequency in order to compensate for undesired optical feedback, that is to say optical feedback where parasitic laser light is reflected to the laser diode 116 resulting in unstable laser behavior. The frequency range of the frequency modulation may be in the range of megahertz, e.g. 500 MHz. In such an embodiment, as error signal of the feedback loop the electric drive current powering the electromagnetic radiation source 116 may be used.

In a further alternative embodiment, a reference etalon may be provided in front of (respectively before) the reference detector 202, which reference etalon may be designed as a solid etalon. By means of such embodiment the laser may be stabilized in its emission frequency.

The Fabry-Perot etalon 106 is an arrangement of two plane-parallel rigid non-movable mirrors 108 having a reflectance of about 90%. The distance d can be 5 mm, but also 0.5 mm. Larger and smaller distances are possible. The reflective property can be achieved by dielectric coating of a substrate or by depositing silver or aluminium layers. Alternatively, the surface can be cleaved, for instance when manufacturing a device on the basis of silicon.

Finally, it should be noted that the term "comprising" does not exclude other elements or features and the "a" or "an" does not exclude a plurality. The verb 'comprise' and its conjugations do not exclude the presence of elements or steps other than those listed in any claim or the specification as a whole. The singular reference of an element does not exclude the plural reference of such elements and vice-versa. The mere fact that certain measures are recited in mutually different dependent claims does not indicate that a combination of these measures cannot be used to advantage. Furthermore, elements described in association with different embodiments may be combined. Finally, it should be noted that the above-mentioned examples, and embodiments illustrate rather than limit the invention, and that those skilled in the art will be capable of designing many alternative embodiments without departing from the scope of the invention as defined by the appended claims. As equivalent elements may be substituted for elements employed in claimed invention to obtain substantially the same results in substantially the same way, the scope of the present invention is defined by the appended claims, including known equivalents and unforeseeable equivalents at the time of filing of this application. Thus, in closing, it should be noted that the invention is not limited to the abovementioned versions and exemplary working examples. Further developments, modifications and combinations are also within the scope of the appended patent claims and are placed in the possession of the person skilled in the art from the present disclosure. Accordingly, the techniques and structures described and illustrated previously herein should be understood to be illustrative and exemplary, and not necessarily limiting upon the scope.

What is claimed is:

1. A transducer for converting an acoustic signal into an electric signal, comprising:

a) a Fabry-Perot (FP) interferometer illuminated by a laser radiation with wavelength λ from a laser, a FP transmittance function being: $T=1/(1+F\ \sin^2(2\pi\cdot d\cdot n/\lambda))$, where F is a coefficient of finesse, d is a distance between two mirrors, and n is a refractive index of a medium in a space between the mirrors, wherein the medium is a gas or a liquid, wherein:

i. the distance d is constant and is off a resonance distance for a wavelength $\lambda_0$; the mirrors themselves and the distance between the mirrors being non-movable and non-deformable;

ii. the distance d corresponds to an operation point of the transducer, the operation point being achieved where a derivative of T is at a maximum or at a minimum value and a second derivative of T is equal to zero; and iii. the space receives an acoustic signal, changing the refractive index n of the medium in the space and thus influencing the laser radiation propagation; and b) a first laser radiation detector detecting an intensity of an outputted laser radiation influenced by the acoustic signal and generating an electric signal, wherein:

i. the electric signal is split into an AC (alternating current) and a DC (direct current) components by a separator;

ii. the AC component of the electric signal is outputted, and the acoustic signal is recovered;

iii. the DC component enters a feedback loop connected to the laser; and iv. the DC component controls a drive current of the laser to irradiate wavelength $\lambda$ being different from wavelength $\lambda_0$, wherein $\lambda$ corresponds to the operation point of the transducer where the second derivative of T is equal to zero.

2. The transducer of claim 1, further comprising a photodiode detecting a signal characteristic of the laser, the transducer further including a differential amplifier, with the photodiode connected to supply its signal to the differential amplifier.

3. The transducer of claim 2, with the differential amplifier chosen from a group consisting of a reference detector and a separate amplifier or preamplifier.

4. The transducer of claim 1, further comprising an electric power source providing a variable control current for the laser, the first detector being connected to the electric power source for control action.

5. The transducer of claim 1, wherein the DC component slowly altering or adapting the wavelength of the laser for at least partially compensating for environmental influences on the transmission function T of the interferometer.

6. The transducer of claim 1, with a differential amplifier having a first input coupled to an output of the first detector and a second input coupled to an output of a second electromagnetic radiation detector integrated in the laser.

7. The transducer of claim 1, wherein a bias tee separates the electrical signal into the AC and the DC component.

8. The transducer of claim 1, wherein a current source for the laser performs frequency modulation of the laser radiation.

9. The transducer of claim 1, wherein the feedback loop is connected to the laser to determine a drive current and uses the drive current as an error signal.

10. A method of converting an acoustic signal into an electric signal, comprising the steps of:

a) generating a laser radiation with wavelength $\lambda$ from a laser;

b) coupling the laser radiation into a space between two mirrors of a Fabry-Perot (FP) interferometer, a FP transmittance function being: $T=1/(1+F \sin 2(2\pi \cdot d \cdot n/\lambda))$, where F is a coefficient of finesse, d is a distance between the mirrors, and n is a refractive index of a medium in a space between the mirrors, wherein the medium is a gas or a liquid;

c) arranging the mirrors and the distance between mirrors to be non-movable and non-deformable;

d) placing mirrors at the distance d, the distance d being off a resonance distance for a wavelength $\lambda_0$; the distance d corresponding to an operation point of the transducer, wherein the operation point is achieved where a derivative of T is at a maximum or at a minimum value and a second derivative of T is equal to zero;

e) coupling an acoustic signal into the space between the mirrors to influence the laser radiation propagation;

f) detecting an influenced laser radiation with a first electromagnetic radiation detector to generate an electric signal;

g) splitting the electric signal into an AC (alternating current) and a DC (direct current) component;

h) recovering the acoustic signal from the AC component;

i) controlling an electric drive current powering the laser to irradiate wavelength $\lambda$ being different from wavelength $\lambda_0$, wherein $\lambda$ corresponds to the operation point of the transducer where the second derivative of T is equal to zero.

11. The method of claim 10, further comprising: generating a reference signal by converting the laser radiation directly behind the laser into a voltage and forming a difference signal between the electric signal indicative of the acoustic signal and the reference signal.

12. The method of claim 10, further comprising: modulating a frequency of the laser to compensate for undesired optical feedback.

13. The method of claim 12, wherein a modulation frequency is above 500 MHz.

14. The method of claim 10, further comprising using the electric drive current powering the laser as an error signal of the feedback loop.

15. The method of claim 10, further comprising stabilizing the laser in its radiation frequency using a reference interferometer in front of a reference detector.

16. The method of claim 10, further comprising a differential signal evaluation, in which a positive as well as a negative edge or a shoulder of a transmission curve are evaluated and a differential signal is generated.

17. The method of claim 10, further comprising: modulating the wavelength of the laser radiation with a frequency that is significantly different from a highest acoustic wave frequency to be measured.

18. The method of claim 10, wherein a modulating frequency is above 20 kHz.

* * * * *